No. 867,690. PATENTED OCT. 8, 1907.
C. E. WHITMORE.
HUMIDIFIER.
APPLICATION FILED JAN. 8, 1903.
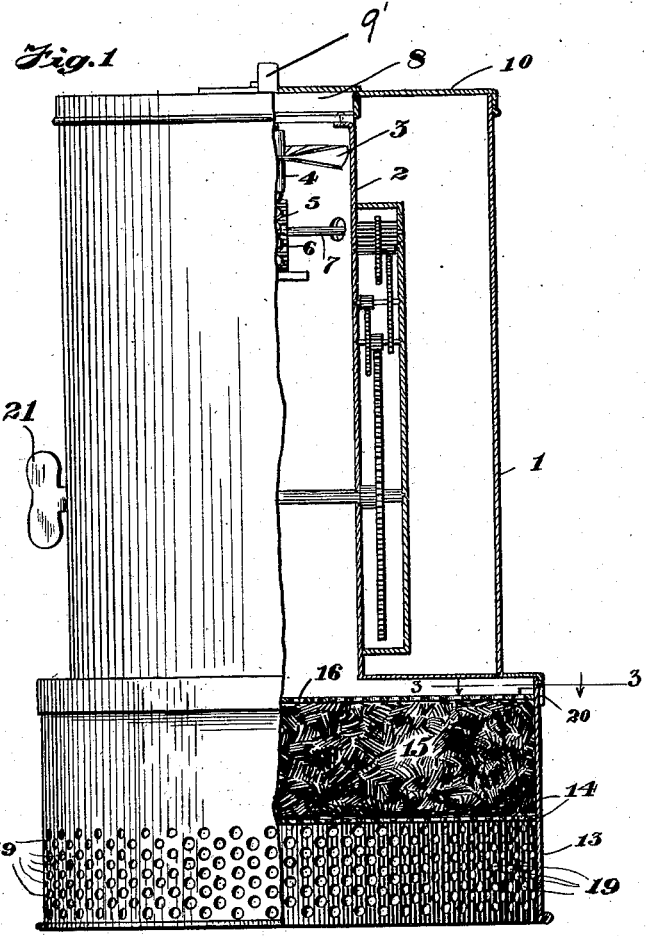
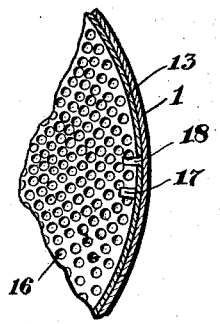
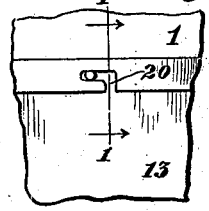
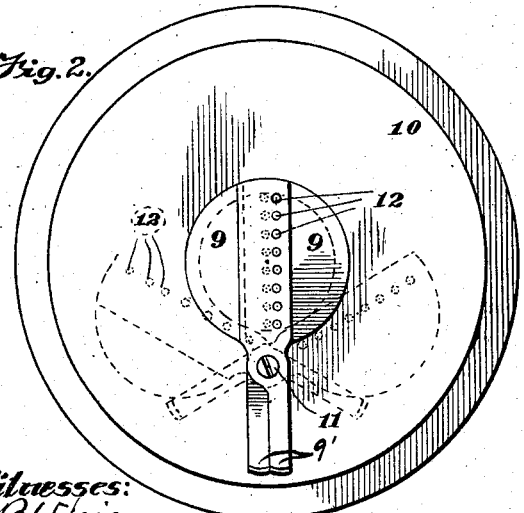
Witnesses:
J. B. Weir
Ira D. Perry
Inventor.
Charles E. Whitmore
By John N. Neil, Atty.

UNITED STATES PATENT OFFICE.

CHARLES E. WHITMORE, OF CHICAGO, ILLINOIS.

HUMIDIFIER.

No. 867,690.  Specification of Letters Patent.  Patented Oct. 8, 1907.

Application filed January 8, 1903. Serial No. 138,220.

*To all whom it may concern:*

Be it known that I, CHARLES E. WHITMORE, a citizen of the United States of America, residing at Chicago, in the county of Cook and State of Illinois, have invented certain new and useful Improvements in Humidifiers, of which the following is a description.

My invention belongs to that class of devices which is intended to increase the humidity within a certain space for the purpose of moistening and keeping in good condition tobacco, cigars, and the like as well as for similar and kindred use.

It has for its object more simple and effectual means for the purpose set forth, and consists in the novel construction arrangement and combination of parts herein shown and described, and more particularly pointed out in the claims.

In the drawings wherein like reference characters indicate like or similar parts; Figure 1, is a side elevation of my improvement, partially broken away to show the construction, Fig. 2, is a top plan of the same, Fig. 3, is a section in line 3—3 of Fig. 1, and Fig. 4, is a detail view.

In the drawings 1 represents a casing, preferably cylindrical in shape and provided with a central cylindrical tube 2, extending from a point near the top of the cylinder 1, to the bottom thereof. A horizontally rotatable fan 3, is positioned in said cylinder 2, with suitable means to cause the rotation of said fan. As shown a vertical shaft 4, is provided with a worm 5, driven by a cog-wheel 6, mounted upon a shaft 7. A preferably spring motor drives the shaft 7, as clearly shown in the drawings. Any preferred form of motor may be employed for this purpose. The casing 1, is provided with a central opening 8, at its top substantially registering with the cylinder 2. When this opening is unobstructed, it will be seen that the operation of the fan which is arranged for that purpose will draw air in at the top of the cylinder 2, and discharge the same at the bottom thereof. Means are provided to control the volume of air permitted to enter the cylinder 2. This may be done in any preferred manner. As shown in the drawings a pair of slide cover valves 9, 9, are pivotally connected to the top 10, at 11. By closing or partially closing the said slides 9, 9, the area of the opening 8, will be varied to control the volume of air permitted to pass therethrough. This is an important feature of my invention, as the humidity in the atmosphere varies to such an extent, that the use of a humidifier is sometimes not necessary, while soon after the atmosphere may be so dry and devoid of moisture as to require a very large quantity of moisture diffused through the apartment. In the preferred form I form a plurality of apertures 12, along the proximate edges of the valves 9, 9, so that when the proximate edges of the valves meet those apertures may still be uncovered and permit a small volume of air to pass through. Upon further closing the valves, however, the apertures are so arranged that each wing serves to cover the apertures formed in the other and thus substantially all the air is prevented from entering the cylinder 2. By this arrangement the most complete control is provided for the operation of the device. It is obvious that any preferred means may be employed for the purpose of thus controlling the volume of air admitted to the air cylinder, that shown being simple, effective and the preferred means. Preferably the valves 9, are provided with extensions 9′ having upturned ends which form convenient handles by which the valves may be adjusted.

Means are provided to pass the current of air created by the action of the fan 3, through a moist stratum. This may be accomplished in any preferred manner. As shown in the drawings the base 13, is provided with a preferably foraminated bottom 14, arranged to support a layer of sponge or equivalent material placed thereon and proportioned to suitably fill the inclosed space. If desired a similar foraminated cover 16, may be placed upon the material 15, to keep the same in position. As shown such a cover is formed to fit within the shell 13, slots 17, being formed in the margin thereof and arranged to coöperate with pins 18, extending inward from the shell. By this means the slots may be passed over the pins and given a slight turn to engage the cover with the pins and retain the cover in place. The bottom of the shell is provided with a number of perforations or holes 19, permitting the escape of the air therefrom. The base 13, is formed to be suitably connected to the top cylinder 1, in any preferred manner. As shown a simple slip joint is formed of the two as shown at 20. If preferred a bayonet joint may be formed between the two to insure a suitable connection and prevent accidental disengagement of the same. Fig. 4, shows such a connection.

The mode of operation is apparent. The sponge or equivalent material 15, being suitably moistened is placed in the base 13, and the latter is securely attached to the cylinder. The spring motor may then be wound up by means of the key 21, and the valves 9, 9, opened as desired. The operation of the fan 3, will draw a volume of air into the cylinder 2, dependent upon the opening permitted by the valves 9, 9, said volume of air being forced through the moist or wet stratum 15, and out through the apertures 19, formed in the base 13. If at any time it is found that the humidity is too great, the valves may be partially closed to control the volume of air forced through the device. The adjustability of the device to control the volume of the current of air driven through it is an important feature and permits the device to be regulated to increase or decrease the humidity.

It is obvious that after having described my improvement various immaterial modifications may be made without departing from the spirit of my invention, hence I do not wish to be understood as limiting myself to the exact form shown and described.

Having thus described my invention what I claim as new and desire to secure by Letters-Patent is;

1. A device of the kind described, comprising an inlet tube the lower portion of which is enlarged to form a chamber, perforations formed in the lower portion of the walls of said chamber, a foraminated plate dividing said chamber above the perforations, a layer of porous material extending across said chamber supported by said plate, an upper perforated plate spaced from the top of said chamber, resting upon said porous material, and a regulating valve at the entrance to said inlet tube, in combination with a fan within said tube whereby air may be drawn into the tube and discharged through the perforations in said chamber after passing through said porous material.

2. A device of the kind described, comprising a vertical inlet tube enlarged at its lower end to form a chamber, and a layer of moist porous material extending across said chamber, in combination wtih a rotary fan positioned in said air tube and means for driving the same, and a pair of slidable valve plates adapted to jointly cover the upper end of said air tube, each plate arranged to be independently moved to vary the inlet to said tube.

3. A device of the kind described, comprising a vertical air tube whose cross section is increased near its lower end to form a chamber, a horizontal layer of moist porous material extending across said chamber at a point about midway of its height and a pair of pivoted valve plates adapted to be operated independently of each other to control the inlet opening to said tube, in combination with a rotary fan within said air tube, and means for driving said fan.

4. In a device for humidifying air, an air tube, a subjacent layer of moist porous material, a rotary fan and means for driving it, in combination with a pair of pivoted slidable valve-plates positioned close to the outer end of the air tube, said plates having apertures through their proximate edges, and one of said plates partially overlapping the other; substantially as described.

5. A device for humidifying air, an air tube, a subjacent layer of moist porous material, a rotary fan within the air tube, means for driving the fan, in combination with a plate 10 having an opening that substantially registers with the top of said tube, and a pair of valve-plates, one of which partially overlaps the other, said plates being pivotally connected to said plate 10, and each plate having a plurality of apertures therein, for the purpose described.

CHARLES E. WHITMORE.

Witnesses:
JOHN W. HILL,
CHARLES I. COBB.